(12) United States Patent
Natkin et al.

(10) Patent No.: US 6,748,934 B2
(45) Date of Patent: Jun. 15, 2004

(54) ENGINE CHARGE AIR CONDITIONING SYSTEM WITH MULTIPLE INTERCOOLERS

(75) Inventors: Robert Jay Natkin, Canton, MI (US); August Thomas Vaught, Harper Woods, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 26 days.

(21) Appl. No.: 10/248,577

(22) Filed: Jan. 30, 2003

(65) Prior Publication Data

US 2003/0098011 A1 May 29, 2003

Related U.S. Application Data

(63) Continuation-in-part of application No. 09/683,072, filed on Nov. 15, 2001, now abandoned.

(51) Int. Cl.[7] ............................................. F02B 33/00
(52) U.S. Cl. .................... 123/563; 60/599; 62/323.1
(58) Field of Search ............................... 123/563, 295; 60/599; 62/323.1, 172

(56) References Cited

U.S. PATENT DOCUMENTS

| 4,010,613 | A | | 3/1977 | McInerney | |
|---|---|---|---|---|---|
| 4,236,492 | A | * | 12/1980 | Tholen | 123/563 |
| 4,237,689 | A | * | 12/1980 | Sampietro | 60/599 |
| 4,317,439 | A | * | 3/1982 | Emmerling | 123/563 |
| 4,683,725 | A | | 8/1987 | Sugiura | 62/323.1 |
| 4,918,923 | A | | 4/1990 | Woolenweber et al. | |
| 4,936,262 | A | | 6/1990 | Paul et al. | |
| 5,036,668 | A | | 8/1991 | Hardy | 123/563 |
| 5,081,977 | A | | 1/1992 | Swenson | |
| 5,144,812 | A | | 9/1992 | Mills, Jr. et al. | |
| 5,269,143 | A | | 12/1993 | Cikanek et al. | 123/563 |
| 5,305,714 | A | * | 4/1994 | Sekiguchi et al. | 123/3 |
| 5,394,854 | A | * | 3/1995 | Edmaier et al. | 123/563 |
| 5,415,147 | A | | 5/1995 | Nagle et al. | 123/563 |
| 5,435,289 | A | | 7/1995 | Pendlebury et al. | 123/563 |
| 5,492,103 | A | | 2/1996 | Goto | |
| 5,598,705 | A | | 2/1997 | Uzkan | 60/599 |
| 5,669,338 | A | | 9/1997 | Pribble et al. | |
| 5,809,981 | A | | 9/1998 | Berg | |
| 5,875,633 | A | | 3/1999 | Lawson, Jr. | 60/618 |
| 6,006,540 | A | | 12/1999 | Coletti | 123/563 |
| 6,347,618 | B1 | | 2/2002 | Klem | |
| 6,381,973 | B1 | * | 5/2002 | Bhatti et al. | 60/172 |
| 6,510,690 | B2 | * | 1/2003 | Furukawa et al. | 123/563 |

FOREIGN PATENT DOCUMENTS

| DE | 2301666 | A | * | 7/1974 | F02B/53/00 |
|---|---|---|---|---|---|
| EP | 750106 | A1 | * | 12/1996 | F02G/5/04 |
| JP | 60093118 | A | * | 5/1985 | F02B/29/04 |
| JP | 61065017 | A | * | 4/1986 | F02B/29/04 |
| JP | 62279228 | A | * | 12/1987 | F02B/29/04 |
| JP | 63075312 | A | * | 4/1988 | F02B/29/04 |

* cited by examiner

Primary Examiner—Thomas Denion
Assistant Examiner—Thai Ba Trieu

(57) ABSTRACT

An automotive engine has a charge air conditioning system, including a charge booster, and a first intercooler for transferring heat from charge air flowing from the booster. The first intercooler transfers heat from the charge air to ambient air, and a second intercooler downstream from the first intercooler further reduces the heat content of the charge air by transferring heat from the charge air to a refrigerated fluid. An engine control module controls the engine's spark timing and fuel charge as a function of at least the amount of air charge cooling provided by the second intercooler. The present engine is particularly well adapted to operate on gaseous hydrogen fuel.

20 Claims, 4 Drawing Sheets

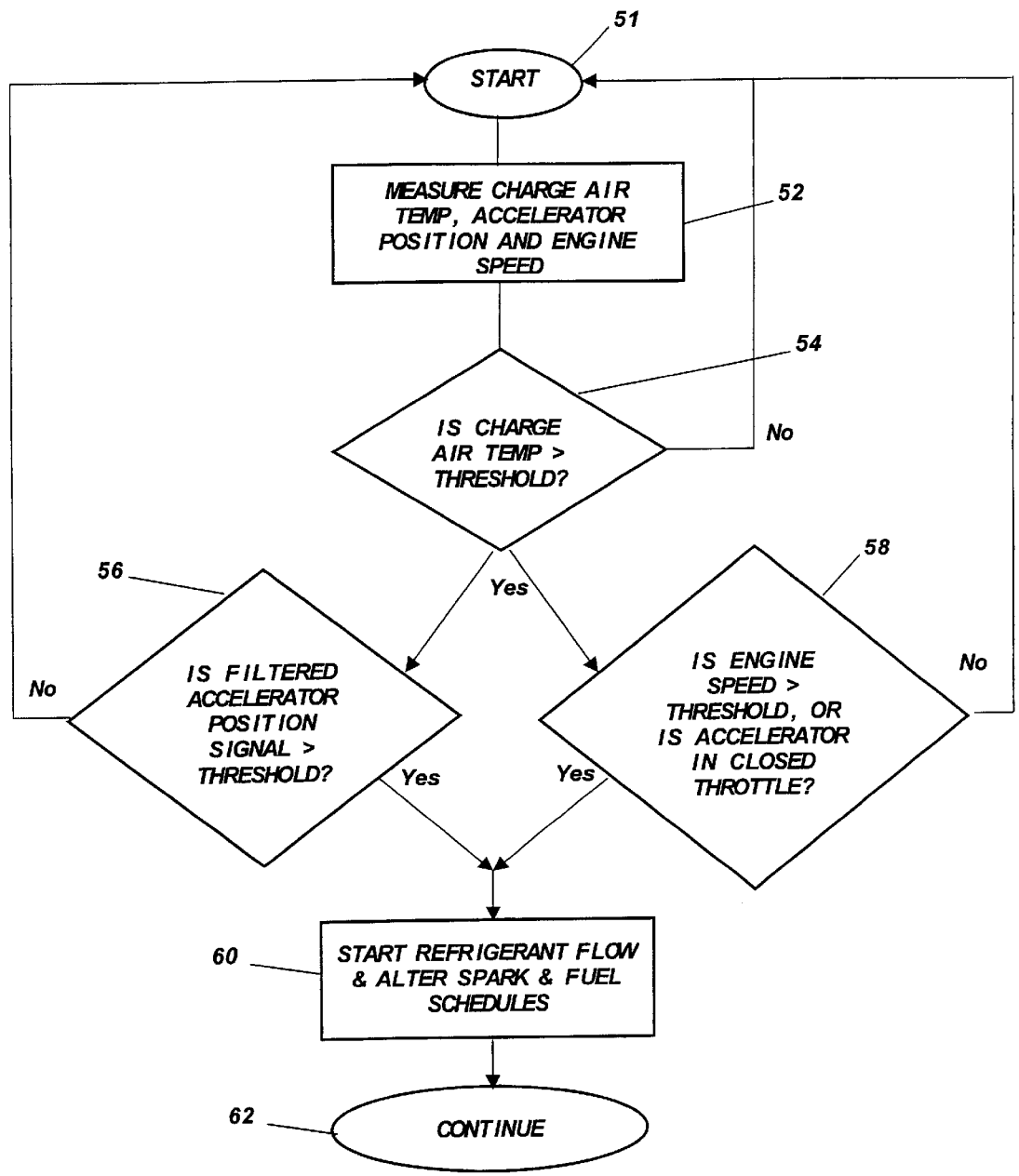

ENGINE CHARGE AIR CONDITIONING SYSTEM WITH MULTIPLE INTERCOOLERS

BACKGROUND OF INVENTION

This is a continuation-in-part of application Ser. No. 09/683,072, filed Nov. 15, 2001, now abandoned.

1. Field of the Invention

The present invention relates to a system for providing compressed and chilled air to an internal combustion engine, while minimizing the attendant fuel consumption penalty.

2. Disclosure Information

In their efforts to provide engines with higher specific output, automotive designers in particular have a devised a veritable plethora of systems for increasing the amount of air and, concomitantly, fuel supplied to reciprocating internal combustion engines. The concept of boosting charge, either with a turbocharger or supercharger, is old and well known. Moreover, the concept of using intercooling between a booster device, such as the turbocharger or supercharger, and the engine is also well known. The present invention, however, provides a system in which two intercoolers are used to achieve maximum charge cooling and densification, while at the same time avoiding an excessive fuel economy penalty. The present system is advantageous because following boosting, charge air enters a first air-to-air heat exchanger wherein heat within the incoming charge air is removed, with the extracted heat being exhausted to the ambient, and with the charge air then flowing to a second intercooler which is liquid cooled. In this manner, it is possible for very high specific output to be achieved with an engine.

SUMMARY OF INVENTION

An engine having a charge air conditioning system includes a charge booster, a first intercooler for transferring heat from charge air flowing from the booster, with the first intercooler transferring heat from the charge air to ambient, and a second intercooler downstream from the first intercooler for transferring heat from the charge air to a refrigerated fluid. The charge booster may comprise either an engine driven supercharger or a turbocharger driven by exhaust gases from the engine, and yet other types of charge boosters known to those skilled in the art and suggested by this disclosure.

The second intercooler of the present system transfers heat from the charge air to a liquid which may be cooled by a refrigeration system powered by the engine. If desired, the second intercooler may transfer heat from the charge air to a refrigerant flowing through the second intercooler so as to change the state of at least a portion of the refrigerant from a liquid to a gas. The refrigerant system may be used to cool both the passenger compartment of a vehicle and the second intercooler. The refrigerant may comprise common compounds, such as R134a or any of the other compounds commonly employed as working fluids in automotive air conditioning systems. The supply of refrigerant to the second intercooler is controlled by an electronic engine controller in response to a plurality of engine operating parameters such as throttle position, and the rate of change of throttle position, ambient temperature, air charge temperature, and other parameters known to those skilled in the art and suggested by this disclosure.

The second intercooler may also be cooled by an air-to-air heat exchanger as well, in combination with a liquid-to-liquid heat exchanger cooled by the air conditioning system. In this case, the working fluid provided to the second heat exchanger will not be refrigerant but rather fluid such as engine coolant commonly comprised of anti-freeze and water.

According to another aspect of the present invention, a method for conditioning charge air for an automotive internal combustion engine includes the steps of compressing the air with a charge booster, removing heat from the compressed charge air by means of a charge air-to-ambient air heat exchanger, and removing additional heat from the charge air by means of a charge air-to-liquid heat exchanger.

It is an advantage of the present charge air conditioning system that an engine having this system may be operated on gaseous hydrogen with a power output equivalent to that of a comparably sized gasoline fueled engine, but with exhaust emissions approaching a zero level.

BRIEF DESCRIPTION OF DRAWINGS

FIG. 4 is a flow chart illustrating a control strategy according to one aspect of the present invention.

DETAILED DESCRIPTION

Figure 1:
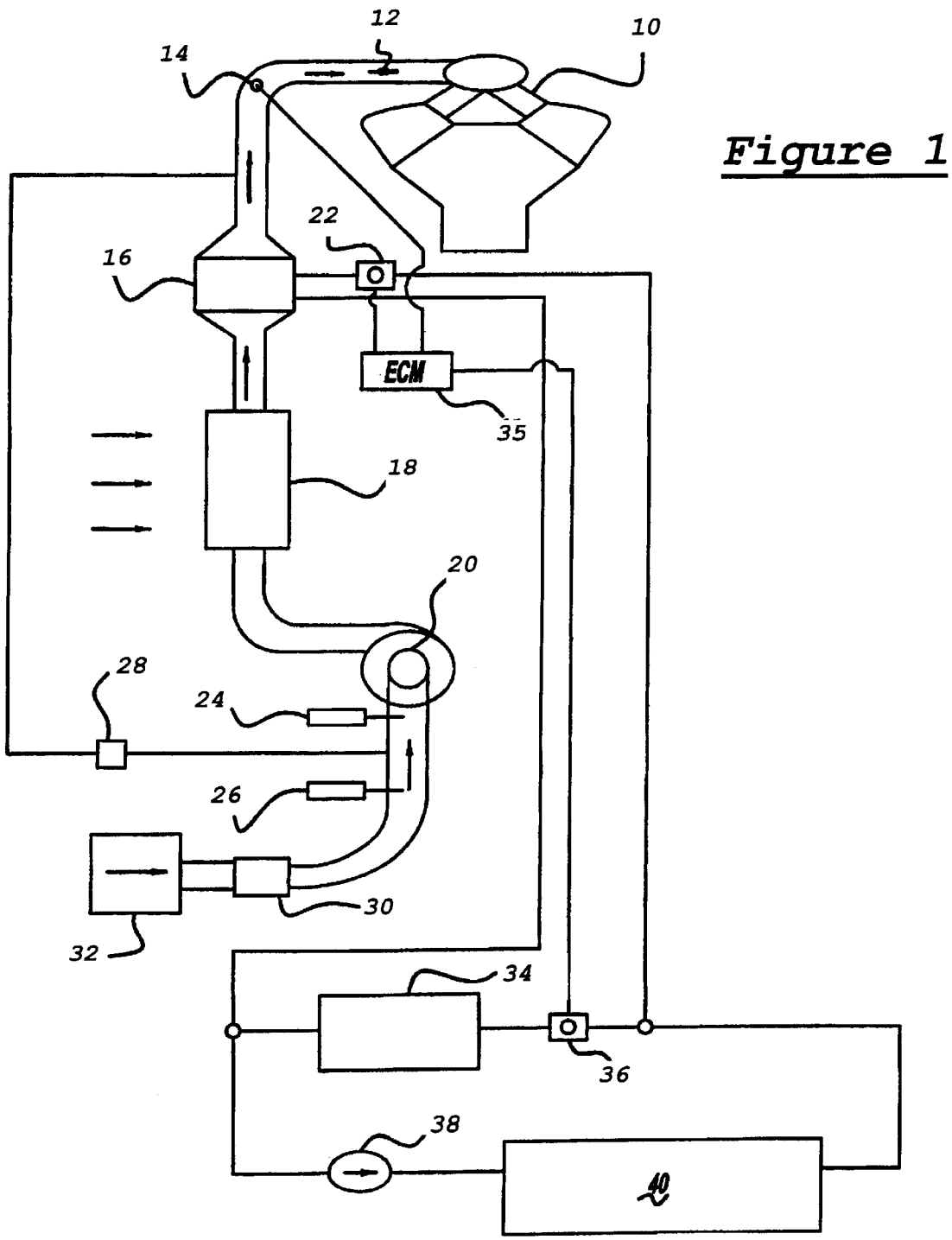
FIG. 1 is a schematic representation of an engine having a charge air conditioning system according to the present invention in which one of the charge air intercoolers is provided with liquid refrigerant which changes state, at least in part, within the intercooler so as to absorb heat from the incoming charge air.

As shown in FIG. 1 (reference numerals are generally the same between FIGS. 1 and 2), engine 10 equipped with air throttle 12 and air charge temperature sensor 14, receives air which has been chilled. Air first passes through air cleaner and 32 past mass air flow sensor 30 and then through charge booster 20, which as noted above, could comprise an engine driven supercharger or an exhaust driven turbocharger. The induction system also includes air bypass valve 28, EGR valve 24, and PCV valve 26.

After leaving charge booster 20, charge air passes through air-to-air intercooler 18. This first intercooler transfers heat from the charge air to the ambient air. Leaving first intercooler 18, charge air passes through second intercooler 16, which comprises an air-to-liquid intercooler. The provision of chilled fluid to second intercooler 16 comprises the major difference between the embodiments of FIGS. 1 and 2. In FIG. 1, second intercooler 16 receives refrigerant from a system which may be used to provide passenger compartment cooling if so desired. From this system, which will be explained below, refrigerant such as R134a is introduced through intercooler control valve 22 to intercooler 16. While in intercooler 16, the refrigerant passes through a series of passages configured in the common manner known to those skilled in the art and suggested by this disclosure. Of course, as the refrigerant R134a changes state from a liquid to a gas, it extracts heat from charge air passing through second intercooler 16.

Second intercooler 16 is provided with liquid refrigerant by means of compressor 38 and condenser 40 which function in the manner known to those skilled in the art and suggested by this disclosure. It is noted that air conditioning evaporator 34 is provided so as to make available cooling for the passenger compartment of the vehicle. Flow through air conditioning evaporator 34 is controlled by valve 36, that which is an evaporator control valve. The inventors of the present invention have found that it is very advantageous to provide second intercooler 16, because with many operating conditions, it is simply not possible to achieve a high level of cooling using only air-to-air intercooler 18.

Figure 3:
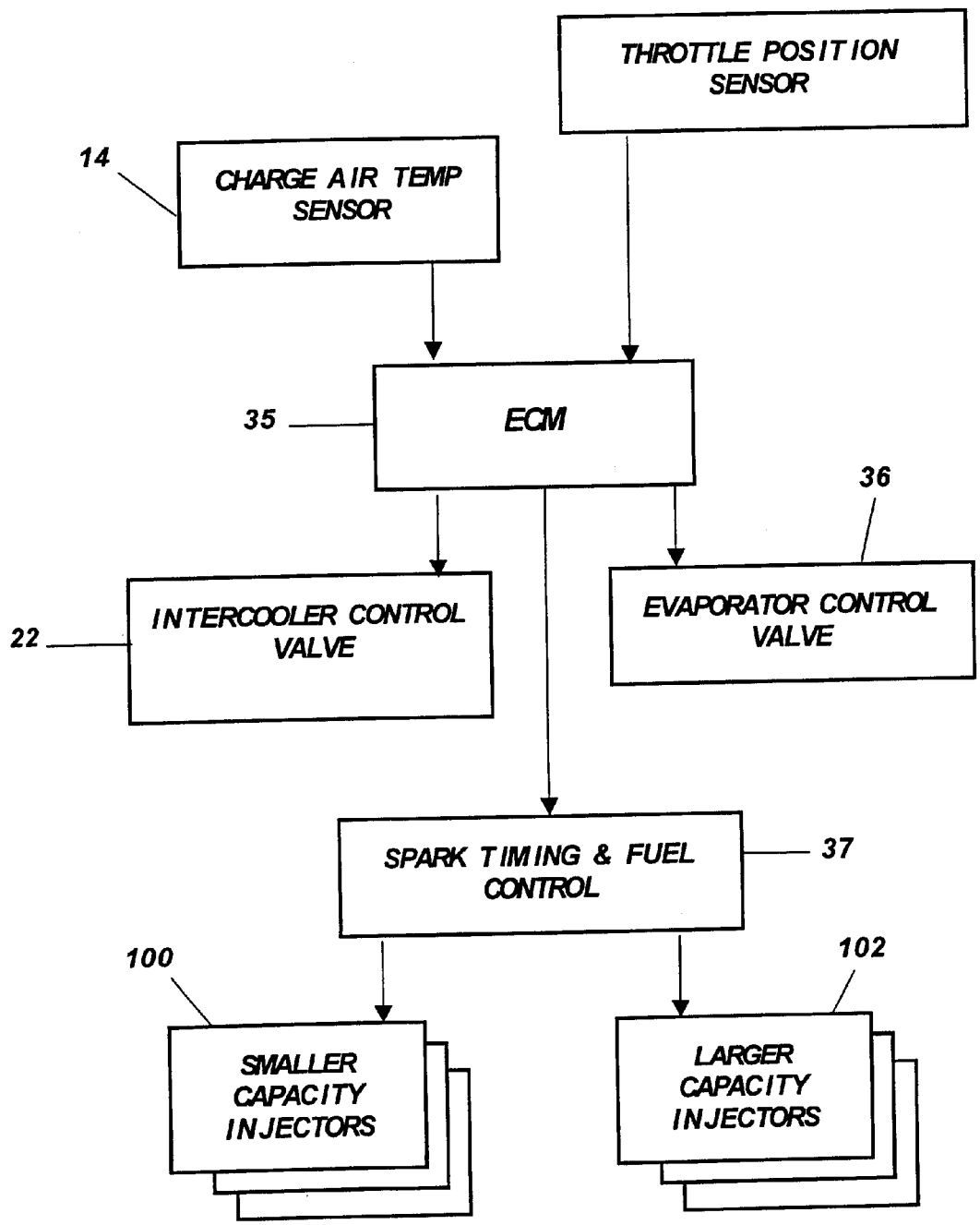
FIG. 3 is a block diagram of a control system comprising a portion of the present charge air conditioning system.

A system according to the present invention may be controlled by either a conventional engine controller such as the illustrated ECM 35, or by other types of controllers known to those skilled in the art and suggested by this disclosure. As shown in FIG. 3, ECM 35 receives signals from a plurality of engine operating parameter sensors, such as charge air temperature sensor 14, and throttle position sensor 13. Other sensors known to those skilled in the engine control art and suggested by this disclosure are also included. FIG. 3 also illustrates intercooler control valve 22 and evaporator control valve 36. Intercooler control valve 22 governs the flow of refrigerant to intercooler 16. This flow of refrigerant is controlled by ECM 35 according to the flow chart of FIG. 4.

Having initiated the control sequence at block 51 of FIG. 4, ECM 35 moves to block 52, wherein charge air temperature, accelerator position, and engine speed are measured. Then, at block 54 the charge air temperature is compared with a threshold value. The inventors of the present system have determined that for a hydrogen fueled engine, 50° C. is a suitable threshold value for beginning to introduce refrigerant to intercooler 16. Thus, if the answer to the question posed at block 54 is 'yes', ECM 35 moves in parallel fashion to blocks 56 and 58. At block 56, a question is asked about whether the accelerator position signal, after being filtered, exceeds a threshold value. If the answer is 'no', the routine moves to block 52 and continues. If the answer is 'yes', the routine moves to block 60, wherein controller 35 starts the refrigerant flow in intercooler 16 and alters the spark timing and fuel supply schedules accordingly. In general, the spark timing will be advanced, and the fuel mixture made more fuel rich when liquid intercooling is supplied. These alterations of spark timing and fuel control may be proportional to the flow of refrigerant into intercooler 16. With hydrogen, it has been found beneficial to use two sets of port fuel injectors, with smaller injectors 100 for normal operation ( FIG. 3), and injectors 102 having a greater range of authority for higher power operation.

In a parallel track to the operation at block 56, at block 58 if engine speed exceeds a threshold value, or if the accelerator is in a closed throttle position, the routine will move to block 60 and take the actions previously described therein.

Those skilled in the art will appreciate in view of this disclosure that the use of the term "throttle" in this specification merely refers to the intention of the vehicle's driver. Thus, "closed throttle" means that a vehicle's driver has lifted off the accelerator pedal, regardless of whether the engine has an actual throttle valve. As noted above, the accelerator position signal is filtered. This is preferably accomplished by means of a digital filter. This technique allows the control system to accommodate an aggressive driver who frequently tips into and out of the throttle, by keeping the refrigeration of intercooler 16 in operation even when the engine speed temporarily dips below a predetermined threshold.

ECM 35 controls intercooler control valve 22 and evaporator control valve 36 so as to minimize parasitic energy loss, by controlling the flow rate of refrigerant to air-to-liquid intercooler 16. Air charge temperature sensor 14 communicates with ECM 35 such that if the temperature of the air charge exceeds a predetermined threshold, more refrigerant will be admitted by ECM 35 and valve 22 to intercooler 16. The present system uses a closed loop temperature control, which is well known to those skilled in the art, to control the temperature of charge air flowing from intercooler 16 to the engine.

Figure 2:
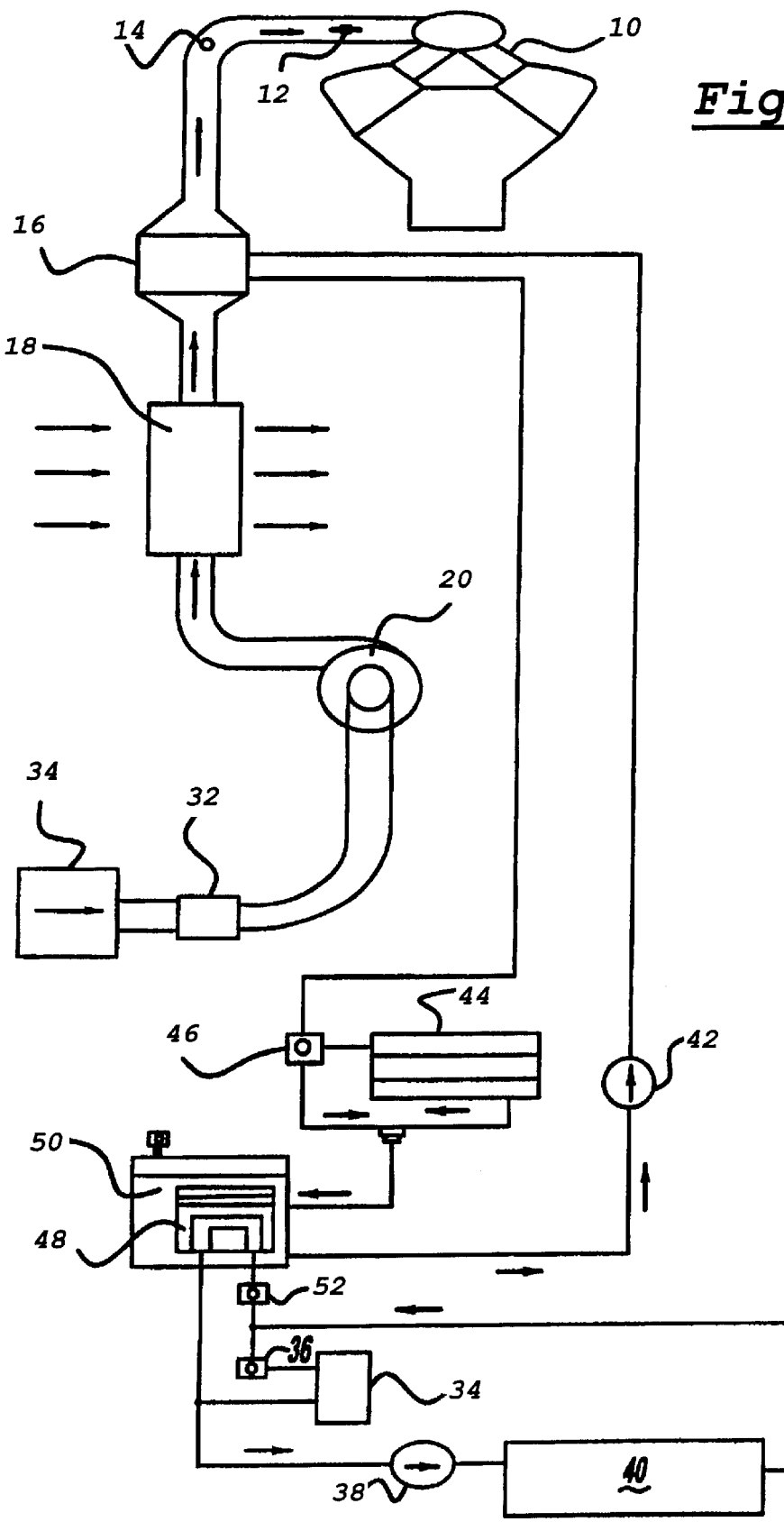
FIG. 2 illustrates a second embodiment of the present invention in which one of the intercoolers is provided with a refrigerated liquid which does not change state when it passes through the second intercooler.

In the embodiment of FIG. 2, second intercooler 16 is provided with chilled liquid, which does not change state as it passes through intercooler 16. Rather, pump 42 circulates fluid through second intercooler 16 and past valve 46 and then through to air-to-air heat exchanger 44, provided sufficient cooling is achieved with air-to-air heat exchange. If this is not possible, valve 46 will allow passage of the fluid through reservoir 50, which is chilled by air conditioning to water evaporator 48. Evaporator 48 is provided with liquid refrigerant by means of compressor 38 and condenser 40, as before. The flow through evaporator 48 is controlled by means of valve 52, and the flow through air conditioning evaporator 34 is controlled by valve 36. In this manner, it is possible to provide cooling to intercooler 16 without the necessity of circulating liquid refrigerant to intercooler 16. Valves 52 and 36 and pump 42 are controlled by ECM 35.

Although the present invention has been described in connection with particular embodiments thereof, it is to be understood that various modifications, alterations, and adaptations may be made by those skilled in the art without departing from the spirit and scope of the invention. It is intended that the invention be limited only by the appended claims.

What is claimed is:

1. A spark-ignited internal combustion engine having a charge air conditioning system, with said conditioning system comprising:
    a charge booster;
    a first intercooler for transferring heat from charge air flowing from the booster to ambient air;
    a second intercooler, downstream from the first intercooler, for transferring heat from the charge air to a refrigerant fluid provided by a refrigeration system powered by the engine; and
    a controller for controlling the flow of refrigerant fluid to the second intercooler, with the controller also controlling the engine's fuel charge and spark timing as a function of at least the rate of flow of the refrigerant fluid.

2. The charge air conditioning system according to claim 1, wherein said charge booster comprises an engine driven supercharger.

3. The charge air conditioning system according to claim 1, wherein said charge booster comprises a turbocharger driven by exhaust gases from the engine.

4. The charge air conditioning system according to claim 1, wherein said second intercooler transfers heat from the charge air to a liquid which has been cooled by a refrigeration system powered by the engine.

5. The charge air conditioning system according to claim 1, wherein said second intercooler transfers heat from the charge air to a refrigerant flowing through the second intercooler, so as to change the state of at least a portion of the refrigerant from a liquid to a gas.

6. The charge air conditioning system according to claim 5, wherein said second intercooler receives liquid refrigerant from a refrigeration system which cools a passenger compartment of a vehicle.

7. The charge air conditioning system according to claim 6, wherein said refrigerant comprises compound R134a.

8. The charge air conditioning system according to claim 1, wherein said second intercooler transfers heat from the charge air to a liquid which has been cooled by an air-to-liquid heat exchanger.

9. The charge air conditioning system according to claim 1, wherein said controller monitors the position of an accelerator pedal and controls the flow of refrigerant fluid so as to provide refrigerant fluid to the second intercooler in the event that the accelerator pedal is in a closed throttle position.

10. The charge air conditioning system according to claim 1, wherein said controller receives signals from a plurality of engine operating parameter sensors, including at least an accelerator position signal, with said controller filtering said accelerator position signal and controlling the flow of refrigerant fluid so as to provide refrigerant fluid to the second intercooler in the event that the filtered accelerator position signal exceeds a predetermined threshold.

11. The charge air conditioning system according to claim 1, wherein said engine has a plurality of power cylinders, with each of said cylinders having a smaller capacity fuel injector and a larger capacity injector, with said injectors each being operated by said controller.

12. The spark-ignited internal combustion engine according to claim 1, wherein said engine is fueled with gaseous hydrogen.

13. A method for conditioning charge air for an automotive spark-ignited internal combustion engine, comprising the steps of:
   compressing the air with a charge booster;
   removing heat from the compressed charge air by means of a charge air-to-ambient air heat exchanger;
   removing additional heat from the charge air by means of a charge air-to-liquid heat exchanger furnished with a flow of liquid refrigerant; and
   controlling the engine's spark timing and fuel charge as a function of at least the amount of heat removed from the air charge by the air-to-liquid heat exchanger.

14. The method according to claim 13, wherein said charge air-to liquid heat exchanger is furnished with liquid refrigerant which changes phase while absorbing heat from the charge air.

15. The method for according to claim 13, further comprising the step of controlling the flow of refrigerant liquid furnished to the charge air-to-liquid heat exchanger as a function of at least an accelerator position signal.

16. The method according to claim 15, wherein said accelerator position signal comprises a digitally filtered signal.

17. A spark-ignited reciprocating internal combustion engine having a charge air conditioning system, with said conditioning system comprising:
   a charge booster;
   a first intercooler for transferring heat from charge air flowing from the booster to ambient air;
   a second intercooler, downstream from the first intercooler, for transferring heat from the charge air to a refrigerant fluid provided by a refrigeration system powered by the engine; and
   a controller for controlling the flow of refrigerant fluid to the second intercooler as a function of at least an accelerator position signal, with the controller also and controlling the engine's fuel charge and spark timing as a function of at least the magnitude rate of flow of the refrigerant fluid.

18. The spark-ignited reciprocating internal combustion engine according to claim 17, wherein said controller controls the flow of refrigerant fluid to the second intercooler as a further function of engine speed.

19. The spark-ignited reciprocating internal combustion engine according to claim 17, further comprising a plurality of fuel injectors for providing gaseous hydrogen fuel to the engine.

20. The spark-ignited reciprocating internal combustion engine according to claim 19, wherein at least two hydrogen fuel injectors are employed for each cylinder of the engine.

* * * * *